(12) United States Patent
Wong et al.

(10) Patent No.: US 8,294,388 B2
(45) Date of Patent: Oct. 23, 2012

(54) DRIVING SYSTEM WITH INDUCTOR PRE-CHARGING FOR LED SYSTEMS WITH PWM DIMMING CONTROL OR OTHER LOADS

(75) Inventors: Lik-Kin Wong, Tai Po (HK); Tze-Kau Man, Yuen Long (HK)

(73) Assignee: Texas Instruments Incorporated, Dallas, TX (US)

( * ) Notice: Subject to any disclaimer, the term of this patent is extended or adjusted under 35 U.S.C. 154(b) by 185 days.

(21) Appl. No.: 12/800,875

(22) Filed: May 25, 2010

(65) Prior Publication Data

US 2011/0291576 A1    Dec. 1, 2011

(51) Int. Cl.
    *H05B 37/02*    (2006.01)
(52) U.S. Cl. .................... 315/307; 315/247; 315/360
(58) Field of Classification Search .............. 315/209 R, 315/210, 224–225, 246, 247, 250, 291, 307, 315/360
    See application file for complete search history.

(56) References Cited

U.S. PATENT DOCUMENTS

| | | | |
|---|---|---|---|
| 5,396,188 A | 3/1995 | Aoki | |
| 5,420,499 A | 5/1995 | DeShazo | |
| 6,084,465 A | 7/2000 | Dasgupta | |
| 6,239,654 B1 | 5/2001 | Yamamoto | |
| 6,583,609 B1 | 6/2003 | Pardoen | |
| 6,606,257 B2 | 8/2003 | Bourdillon | |
| 6,683,419 B2 | 1/2004 | Kriparos | |
| 6,784,728 B2 | 8/2004 | Fischer | |
| 6,844,760 B2 | 1/2005 | Koharagi et al. | |
| 6,871,289 B2 | 3/2005 | Pullen et al. | |
| 7,058,373 B2 | 6/2006 | Grigore | |
| 7,098,640 B2 | 8/2006 | Brown | |
| 7,115,888 B2 | 10/2006 | Hachiya et al. | |
| 7,119,498 B2 * | 10/2006 | Baldwin et al. | ............... 315/291 |
| 7,132,820 B2 | 11/2006 | Walters et al. | |
| 7,221,134 B1 | 5/2007 | Ling | |
| 7,388,359 B1 | 6/2008 | Ling | |
| 7,425,819 B2 | 9/2008 | Isobe | |
| 7,443,209 B2 | 10/2008 | Chang | |
| 7,550,934 B1 * | 6/2009 | Deng et al. | ..................... 315/308 |
| 7,579,819 B1 | 8/2009 | Ling | |

(Continued)

OTHER PUBLICATIONS

"LM3402/LM3402HV, 0.5A Constant Current Buck Regulator for Driving High Power LEDs", National Semiconductor Corporation, Dec. 2, 2008, 24 pages.

(Continued)

*Primary Examiner* — Tung X Le
(74) *Attorney, Agent, or Firm* — Alan A. R. Cooper; Wade James Brady, III; Frederick J. Telecky, Jr.

(57) ABSTRACT

A method includes receiving a control signal associated with a load, where the control signal is to cause a load change from a perspective of a switching-mode power supply. The method also includes causing the power supply to adjust a current through an inductor of the power supply in response to the control signal. The method further includes delaying delivery of the control signal in order to delay a time of the load change, where the current through the inductor increases during the delay. The control signal could include a request to turn on one or more LEDs. The load could include a current regulator. The method could further include providing the request to the current regulator after the delay, such as after the current through the inductor reaches a specified level. Voltage spikes and audible noise in a capacitor coupled to an output of the power supply can be minimized.

7 Claims, 2 Drawing Sheets

U.S. PATENT DOCUMENTS

| | | | |
|---|---|---|---|
| 7,595,622 B1 | 9/2009 | Tomiyoshi et al. | |
| 7,671,573 B1 | 3/2010 | Ling et al. | |
| 7,750,616 B2 | 7/2010 | Liu | |
| 7,777,461 B2 | 8/2010 | Martin et al. | |
| 7,863,875 B1 | 1/2011 | Guo et al. | |
| 7,948,468 B2 * | 5/2011 | Zane et al. | 345/102 |
| 8,120,288 B2 * | 2/2012 | Liu et al. | 315/320 |
| 2006/0279228 A1 * | 12/2006 | Kato | 315/193 |
| 2007/0132439 A1 | 6/2007 | Tsuzaki | |
| 2008/0224629 A1 * | 9/2008 | Melanson | 315/247 |
| 2009/0230881 A1 * | 9/2009 | Chen et al. | 315/294 |
| 2009/0267573 A1 | 10/2009 | Chien et al. | |

OTHER PUBLICATIONS

"LM3404/04HV, 1.0A Constant Current Buck Regulator for Driving High Power LEDs", National Semiconductor Corporation, Dec. 2, 2008, 24 pages.

"Simple Switcher® Synchronous 1MHz 1.5A Step-Down Voltage Regulator", National Semiconductor Corporation, Dec. 1, 2009, 18 pages.

Tawen Mei, et al., "Circuit and Method for Average-Current Regulation of light emitting diodes", U.S. Appl. No. 11/703,981, filed Feb. 8, 2007.

"PWM LED Driver and Boost, Flyback and SEPIC Controller", Linear Technology Corporation 2005, 24 pages.

"Constant Current LED Driver with Digital and PWM Brightness Control", Texas Instruments, Nov. 2004, 25 pages.

Prathyusha Narra, et al., "An Effective LED Dimming Approach", 2004 IEEE, p. 1671-1676.

T. Suntio et al., "Dynamic Effects of Inductor Current Ripple in Average Current Mode Control", 2001 IEEE, pp. 1259-1264.

Zaohong Yang et al., "DC-to-DC Buck Converters with Novel Current Mode Control", 1999 IEEE, pp. 1158-1164.

Lik-Kin Wong, et al., "On/Off Time Modulation for Constant On-Time and Constant Off-Time Switching Regulators", U.S. Appl. No. 12/658,021, filed Feb. 1, 2010.

Lawrence Hok-Sun Ling, "System and Method for Providing a Pulsating Current Output Having Ultra Fast Rise and Fall Times", U.S. Appl. No. 11/731,961, filed Apr. 2, 2007.

Issac Kuan-Chun Hsu, et al., "Compact and Efficient Driver for Multiple Light Emitting Diodes (LEDs)", U.S. Appl. No. 12/800,755, filed May 21, 2010.

Hok-Sun Ling, "Dynamic Current Equalization for Light Emitting Diode (LED) and Other Applications", U.S. Appl. No. 12/799,611, filed Apr. 28, 2010.

Lik-Kin Wong, et al., "Sensing Capacitor for Constant On-Time and Constant Off-Time Switching Regulators", U.S. Appl. No. 12/661,646, filed Mar. 22, 2010.

* cited by examiner

US 8,294,388 B2

DRIVING SYSTEM WITH INDUCTOR PRE-CHARGING FOR LED SYSTEMS WITH PWM DIMMING CONTROL OR OTHER LOADS

TECHNICAL FIELD

This disclosure is generally directed to driving systems. More specifically, this disclosure relates to a driving system with inductor pre-charging for light emitting diode (LED) systems with pulse width modulation (PWM) dimming control or other loads.

BACKGROUND

Many systems use light emitting diodes (LEDs) to generate light. These systems often include an LED driver that controls a current through one or more LEDs, thereby controlling a brightness of the LEDs. An LED driver can also receive pulse width modulation (PWM) signals used to control the dimming of the LEDs.

Many LED drivers use ceramic capacitors to filter output voltages generated by power supplies. However, PWM dimming can create voltage spikes in the output voltage of a power supply. When a ceramic capacitor is used, these voltage spikes can create audible noise in the ceramic capacitor. Conventional systems often attempt to solve this problem using feed-forward control loops (which suffer from robustness problems) or fast transient controllers (which can still create audible noise).

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
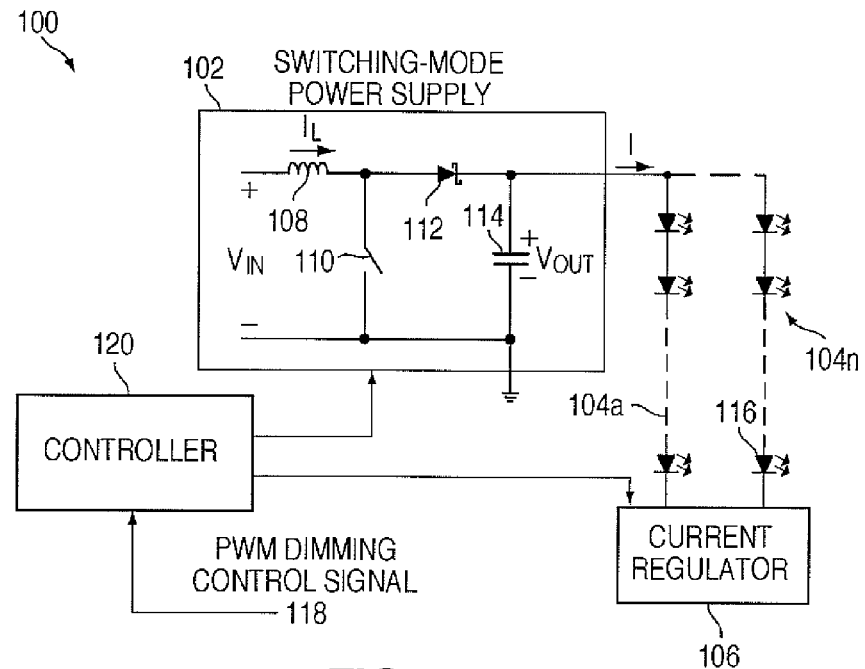
FIG. 1 illustrates an example driving system with inductor pre-charging for light emitting diodes (LEDs) or other loads according to this disclosure.
Figure 3:
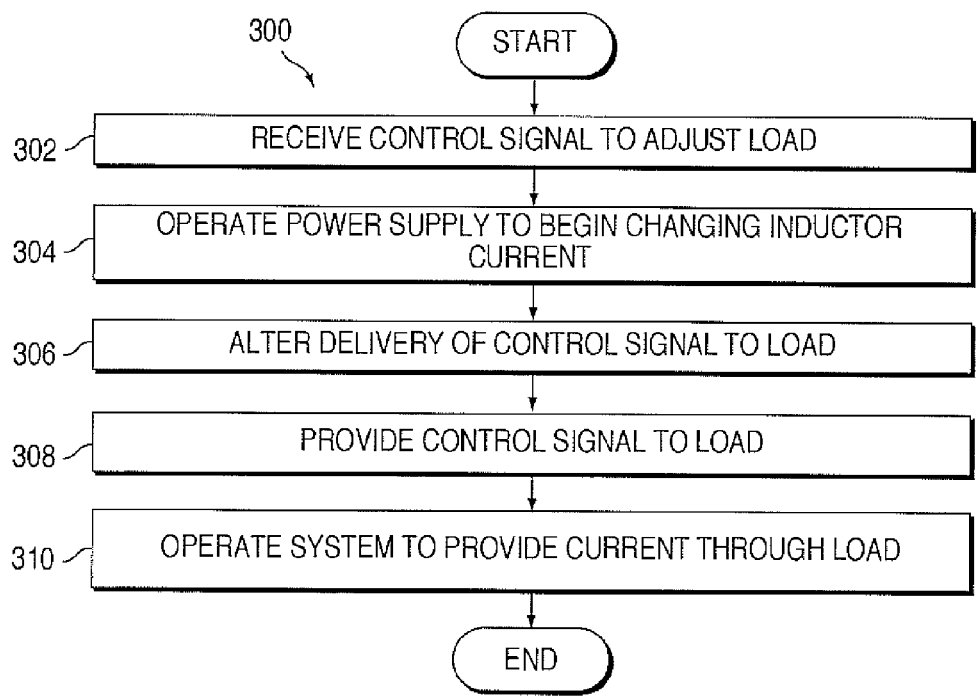
FIG. 3 illustrates an example method for driving of LEDs or other loads using inductor pre-charging according to this disclosure.
Figure 2:
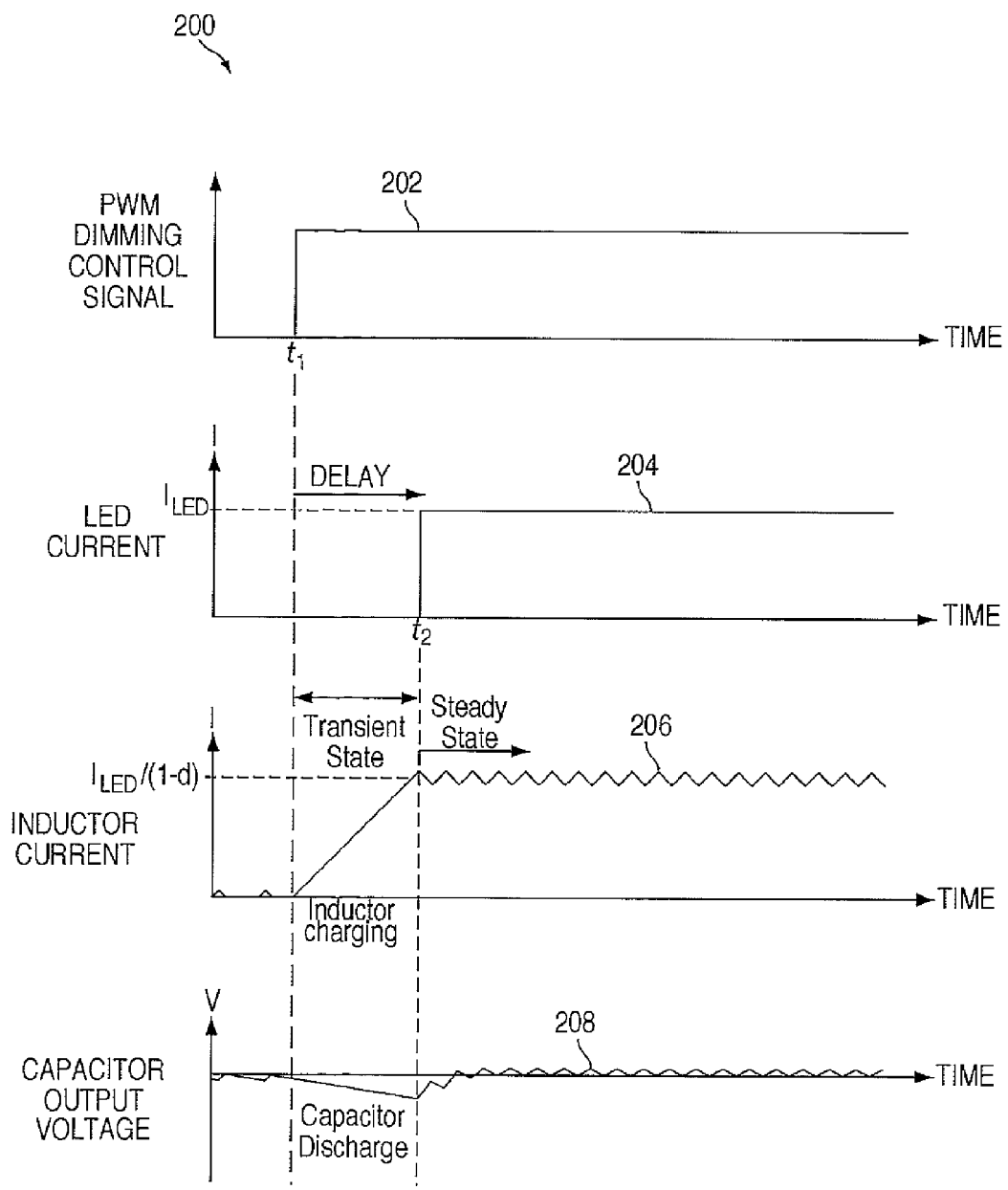
FIG. 2 illustrates example waveforms associated with the driving system of FIG. 1 according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example driving system 100 with inductor pre-charging for light emitting diodes (LEDs) or other loads according to this disclosure. In this example, the driving system 100 includes a switching-mode power supply 102 and a load formed by one or more LED strings 104a-104n and a current regulator 106. The power supply 102 generally receives an input voltage $V_{IN}$, and generates a regulated output voltage $V_{OUT}$. The power supply 102 includes any suitable structure for generating a regulated output voltage, such as a buck, boost, buck-boost, SEPIC, or flyback converter. The input voltage $V_{IN}$ can be provided by any suitable source, such as a battery.

In this example, the power supply 102 represents a boost converter that generates an output voltage $V_{OUT}$ larger than an input voltage $V_{IN}$. In this particular implementation, the power supply 102 includes an inductor 108 coupled to a switch 110 and a diode 112, which is coupled to an output capacitor 114. The inductor 108 includes any suitable inductive structure having any suitable inductance. The switch 110 represents any suitable switching device, such as a power transistor. The diode 112 represents any suitable structure for substantially limiting current flow to one direction. Note that the diode 112 could be replaced by a switch that allows bi-directional current flow. The output capacitor 114 includes any suitable capacitive structure having any suitable capacitance, such as a ceramic capacitor. The power supply 102 generally operates by opening and closing the switch 110 using a gate drive signal, where the duty cycle of the gate drive signal can be adjusted to provide a desired output voltage $V_{OUT}$.

Each LED string 104a-104n includes one or more LEDs 116. Each LED 116 includes any suitable semiconductor structure for generating light. In this example, the LEDs 116 are coupled in series to form a string, and multiple strings 104a-104n are coupled in parallel. However, any other configuration involving the serial and/or parallel connection of LEDs 116 could be used.

The current regulator 106 regulates a current I flowing through the LEDs 116. In some embodiments, the current regulator 106 regulates the current to ensure that an equal amount of current flows through each string 104a-104n (although equal currents need not be used). The current regulator 106 includes any suitable structure for regulating current through one or more LEDs, such as a linear current regulator.

In this example, the current regulator 106 supports the use of pulse width modulation (PWM) dimming control. A PWM dimming control signal 118 can be used to adjust the brightness of the LEDs 116. For instance, the current regulator 106 can turn the current I through the LEDs 116 on and off, adjusting the average current through the LEDs 116 (and therefore adjusting the brightness of the LEDs). This could be done based on a duty cycle of the PWM control signal 118.

The change in brightness of the LEDs 116 effectively appears as a load change to the power supply 102. Voltage spikes can therefore appear in the output voltage $V_{OUT}$ of the power supply 102. These voltage spikes can create audible noise in the output capacitor 114. This problem may be particularly noticeable when ceramic output capacitors 114 are used.

The audible noise can be created due to a transient state of the switching-mode power supply 102. The current $I_L$ through the inductor 108 can be nearly 0 A when the LEDs 116 are turned off and much higher when the LEDs 116 are turned on. The transient state occurs when the inductor current $I_L$ increases rapidly from about 0 A towards a steady-state value $I_{LED}$. During the transient state, at least part of the LED current I is provided by discharging the output capacitor 114. This leads to the creation of large voltage spikes in the output capacitor 114, causing audible noise.

In accordance with this disclosure, the driving system 100 can reduce or minimize audible noise created in the output capacitor 114 by reducing or minimizing the discharge of the output capacitor 114 during the transient state of the power supply 102. This can be accomplished, for example, by delaying the time that the LEDs 116 are turned on, which delays the increase of the LED current I. This allows the inductor current $I_L$ to increase without requiring much (if any) discharge of the output capacitor 114, reducing or eliminating the audible noise. Example details of this operation are shown in FIG. 2.

FIG. 2 illustrates example waveforms 200 associated with the driving system 100 of FIG. 1 according to this disclosure. In FIG. 2, a waveform 202 represents the PWM dimming control signal 118, and a waveform 204 represents the LED current I. Also, a waveform 206 represents the inductor current $I_L$, and a waveform 208 represents the voltage across the capacitor 114.

As shown in FIG. 2, the waveform 202 goes high at time $t_1$. Ordinarily, this would turn on the LEDs 116, causing the LED current I to increase right away. In this case, however, rather than turning on the LEDs 116 immediately, the driving system 100 provides a short delay and turns on the LEDs 116 at time $t_2$. At time $t_2$, the LED current I increases rapidly to a steady-state level $I_{LED}$ and causes the LEDs 116 to generate light.

The delay in turning on the LEDs 116 may correspond approximately or exactly to the transient state of the switching-mode power supply 102. During the transient state, the inductor current $I_L$ increases rapidly from about 0 A to near or at a steady-state value that is ideally expressed as $I_{LED}/(1-d)$ (note that power losses can affect this expression). During the transient state, the output capacitor 114 discharges somewhat, but not as much as it would have if the LEDs 116 were turned on at time $t_1$. As a result, discharge of the output capacitor 114 can be reduced or minimized, which can also reduce the severity of voltage spikes in the output capacitor's voltage.

After the transient state, the switching-mode power supply 102 enters a steady-state where the inductor current $I_L$ ideally ripples around the value $I_{LED}/(1-d)$. During this time, the voltage on the output capacitor 114 can also ripple around some point, but these ripples may be small and high in frequency and therefore cause little or no audible noise.

In this way, the driving system 100 can reduce the number and/or severity of voltage spikes in the output voltage $V_{OUT}$. Since these voltage spikes are related to audible noise in the output capacitor 114, this can reduce or even eliminate audible noise caused by the output capacitor 114. This may be particularly useful, for instance, when a ceramic capacitor is used as the output capacitor 114.

In some embodiments, the value of $I_{LED}$ is often known ahead of time, and the value of d in $I_{LED}/(1-d)$ is often a function of the input and output voltages $V_{IN}$ and $V_{OUT}$ and/or parameters of the power supply. The input and output voltages $V_{IN}$ and $V_{OUT}$ can typically be measured on-line, meaning the value of $I_{LED}/(1-d)$ can often be determined adaptively in the system 100.

To support the delay in turning on the LEDs 116, the driving system 100 includes a controller 120. The controller 120 could perform various options to help reduce or minimize the discharge of the output capacitor 114 during the transient state of the switching-mode power supply 102. For example, the controller 120 could measure the input and output voltages and calculate the value of $I_{LED}/(1-d)$. The controller 120 could also receive the control signal 118. In response to detecting the control signal 118 going high (as in FIG. 2), the controller 120 can cause the power supply 102 to begin increasing the inductor current $I_L$. Once the inductor current $I_L$ reaches a threshold point (such as the steady-state value $I_{LED}/(1-d)$), the controller 120 can provide the high pulse in the control signal 118 to the current regulator 106. This causes the current regulator 106 to turn on the LEDs 116. The controller 120 effectively delays the control signal 118 and therefore delays the time that the current regulator 106 turns on the LEDs, allowing the inductor current $I_L$ to increase and reducing the discharge of the output capacitor 114.

Note that the delay in turning on the LEDs 116 may only be a few microseconds, which can be insignificant when the dimming frequency is relatively slow in comparison (such as about 200 Hz to about 1 kHz). Also note that this approach can be highly robust over the entire range of dimming cycles. In addition, note that decreasing the capacitance of the output capacitor 114 would normally affect both the transient and steady-state responses of the system 100. Here, however, decreasing the capacitance of the output capacitor 114 could significantly affect only the steady-state response of the system 100. The voltage drop during the transient state can be reduced or minimized, resulting in less voltage undershoot. As a result, the nominal output voltage of the power supply 102 can be set lower, higher efficiency can be obtained, and smaller or cheaper output capacitors 114 could be used.

While the above description has described the controller 120 as determining the value of $I_{LED}/(1-d)$, this need not be the case. For example, the controller 120 could cause the power supply 102 to begin increasing the inductor current $I_L$ in response to a pulse in the PWM dimming control signal 118, and the controller 120 could then provide the PWM dimming control signal 118 to the current regulator 106 after a fixed or variable delay. The fixed delay could represent a short delay estimated based on the expected $V_{IN}$ and $V_{OUT}$ values. The variable delay could be based on any other suitable characteristic(s).

The controller 120 includes any suitable structure for controlling a driving system to reduce or minimize spikes in a power supply's output voltage. The controller 120 could, for example, represent a microprocessor, microcontroller, digital signal processor, field programmable gate array, or application specific integrated circuit.

In the example shown in FIG. 1, the load being driven by the power supply 102 includes LEDs 116 and a current regulator 106. Also, audible noise is reduced or minimized by delaying a control signal 118 for the current regulator 106, which (from the perspective of the power supply 102) effectively delays a load change until the inductor current $I_L$ has increased. However, this technique of delaying a load change to allow an inductor current $I_L$ to increase can be used with any suitable load and is not limited to use with just LEDs. Also, while delaying a control signal 118 for the current regulator 106 is used here to delay the load change, any suitable technique could be used to delay a load change. In addition, the above description has described how to delay a load change in order to allow the inductor current $I_L$ to increase. To allow the inductor current $I_L$ to decrease (such as when the LEDs 116 are being turned off), the controller 120 can stop the switching of the switch 110 to allow the LED current I to drop to about 0 A before turning off the LEDs 116.

Although FIG. 1 illustrates one example of a driving system 100 with inductor pre-charging, various changes may be made to FIG. 1. For example, the system 100 could include any number of power supplies, LEDs, LED strings, current regulators, and controllers. Also, the functional division shown in FIG. 1 is for illustration only. Various components in FIG. 1 could be combined, further subdivided, or omitted and additional components could be added according to particular needs. As a particular example, while a boost converter is shown in FIG. 1, the power supply 102 could implement other switching converters. As another particular example, the controller 120 could be incorporated into the current regulator 106 or the power supply 102. Although FIG. 2 illustrates examples of waveforms 202-208 associated with the LED driving system 100 of FIG. 1, various changes may be made to FIG. 2. For instance, FIG. 2 merely illustrates waveforms that might appear in the driving system 100. The signals represented by the waveforms 202-208 could vary and have other characteristics during operation of the driving system 100.

FIG. 3 illustrates an example method 300 for driving of LEDs or other loads using inductor pre-charging according to this disclosure. As shown in FIG. 3, a control signal for adjusting a load is received at step 302. This could include, for example, the controller 120 in the system 100 receiving the PWM dimming control signal 118. The control signal 118 could pulse high when the LEDs 116 are to be turned on. Note, however, that the control signal could be associated with any other load change.

In response, a power supply is operated to begin changing an inductor current at step 304. This could include, for example, the controller 120 generating a gate drive signal for controlling the switch 110. The gate drive signal can cause the switch 110 to open and close in order to begin generating the necessary output voltage $V_{OUT}$, which increases the inductor current $I_L$.

The delivery of the control signal to the load is altered at step 306. This could include, for example, the controller 120 waiting for the inductor current $I_L$ to increase to some threshold value before sending the pulse in the PWM dimming control signal 118 to the current regulator 106. The threshold value could be determined adaptively. For example, each time the LED driving system 100 receives a new value of the PWM dimming control signal 118, the controller 120 could measure the input and output voltages $V_{IN}$ and $V_{OUT}$ and then determine the duty cycle d needed to maintain the output voltage $V_{OUT}$. The duty cycle d can be used to calculate the value of $I_{LED}/(1-d)$ for the new value of the PWM dimming control signal 118. The next time the value of the PWM dimming control signal 118 is received, the controller 120 can retrieve the calculated threshold value $I_{LED}/(1-d)$.

The control signal is provided to the load at step 308, and the system is operated to provide a current through the load at step 310. This could include, for example, the controller 120 providing the high pulse in the PWM dimming control signal 118 to the current regulator 106. The current regulator 106 can then operate to allow the LED current I to flow through the LEDs 116, turning on the LEDs 116. However, the LEDs 116 are turned on after the delay, which allows the inductor current $I_L$ to increase without significantly discharging the output capacitor 114. This helps to avoid large voltage spikes that might otherwise create audible noise in the output capacitor 114.

Although FIG. 3 illustrates one example of a method 300 for LED driving using inductor pre-charging, various changes may be made to FIG. 3. For example, while shown as a series of steps, various steps in FIG. 3 may overlap, occur in parallel, occur in a different order, or occur multiple times. As a particular example, the controller 120 could delay the control signal 118 when the LEDs 116 are being turned on in order to allow the inductor current $I_L$ to increase. The controller 120 could also take steps to allow the inductor current $I_L$ to decrease before turning off the LEDs 116. In either case, the controller 120 is adjusting the delivery of the control signal 118 to the current regulator 106 in order to reduce or minimize voltage spikes in the output capacitor 114.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. An apparatus comprising:
   a current regulator;
   a controller coupled to the current regulator and configured to:
   a) receive a pulse-width modulation (PWM) control signal associated with a load, the PWM control signal to cause a load change from a perspective of a switching-mode power supply;
   b) cause the power supply to adjust a current through an inductor of the power supply in response to the control signal; and
   c) delay delivery of the control signal to the current regulator to delay a time of the load change in order to allow the current through the inductor to increase during the delay of the control signal to a substantial steady state that is in proportion to the load current which is based on an inverse of a duty cycle associated with the PWM control signal, wherein
   i) the PWM control signal comprises a request to turn on one or more light emitting diodes (LEDs);
   ii) the load comprises the current regulator; and
   wherein the controller is configured to:
   a) receive the request to turn on the one or more LEDs by receiving a pulse in the PWM control signal;
   b) delay the pulse in the PWM control signal and provide the delayed pulse to the current generator.

2. The apparatus of claim 1, wherein the controller is configured to adaptively determine the specified level based on at least one parameter of the power supply.

3. The apparatus of claim 1, wherein the controller is configured to minimize voltage spikes in a capacitor coupled to an output of the power supply and to minimize audible noise from the capacitor.

4. A system comprising:
   one or more light emitting diodes (LEDs);
   a switching-mode power supply configured to generate a regulated voltage for the one or more LEDs, the power supply comprising an inductor;
   a current regulator configured to control a current through the one or more LEDs, the current based on the regulated voltage; and
   a controller coupled to the current regulator and configured to:
   (i) receive a request to turn on the one or more LEDs, the request including a pulse-width modulated (PWM) control signal,
   (ii) cause the power supply to increase a current through the inductor in response to the request during a delay period, and
   (iii) cause the current regulator to turn on the one or more LEDs in response to the request after the delay period and, to delay a time of the load change in order to allow the current through the inductor to increase during the delay of the control signal to a substantial steady state that is in proportion to the load current which is based on an inverse of a duty cycle associated with the PWM control signal, wherein i) the PWM control signal comprises a request to turn on the one or more LEDs;

ii) the load comprises the current regulator; and wherein the controller is configured to:

a) receive the request to turn on the one or more LEDs by receiving a pulse in the PWM control signal;

b) delay the pulse in the PWM control signal and provide the delayed pulse to the current generator.

5. The system of claim 4, wherein the controller is configured to minimize voltage spikes and to minimize audible noise in a capacitor coupled to an output of the power supply.

6. The system of claim 4, wherein the controller is configured to adaptively determine the specified level based on at least one parameter of the power supply.

7. The system of claim 4, wherein the switching-mode power supply comprises a boost converter.

* * * * *